Patented Feb. 17, 1925.

1,526,940

UNITED STATES PATENT OFFICE.

EUGENE STAEGEMANN, OF SPRING VALLEY, NEW YORK, ASSIGNOR, BY MESNE ASSIGNMENTS, TO THE DAYTON CHEMICAL COMPANY, OF DAYTON, OHIO, A CORPORATION OF OHIO.

TOOTH-PASTE COMPOSITION.

No Drawing.   Application filed April 26, 1924.   Serial No. 709,123.

*To all whom it may concern:*

Be it known that I, EUGENE STAEGEMANN, a citizen of the United States, residing in the town of Spring Valley, in the county of Rockland and State of New York, have invented a new and useful Tooth-Paste Composition, of which the following is a specification.

This invention relates to new and useful improvements in a new and useful toothpaste composition.

It is the principal object of my invention to incorporate as the important cleansing and germicidal ingredient of a toothpaste composition, the well known drug ammonium ichthyol sulphonate (ichthyol), or any other salt of ichthyol sulphonic acid, in such a manner as to completely mask its disagreeable taste; or, in other words, to provide a composition or preparation which presents all of the medicinal advantages of ammonium ichthyol sulphonate (ichthyol) or any other salt of ichthyol sulphonic acid without a nauseating taste.

It is well known that ammonium ichthyol sulphonate (ichthyol) or any other salt of ichthyol sulphonic acid possesses the ability of penetrating into albuminous matter and also has a marked germicidal action without being in any way injurious to the body, whether administered externally or internally. It is also known that ammonium ichthyol sulphonate (ichthyol) or any other salt of ichthyol sulphonic acid will combine with gelatinous matter or phlegm, forming a non-adherent mass. It is also well known that the teeth are coated to a greater or less degree with a slimy phlegm-like film, tenacious in character, which carries bacteria of decay and disease, and also various mineral salts which, when precipitated upon the teeth, cause the formation of tartar, together with discoloration.

The use of ammonium ichthyol sulphonate (ichthyol) or any other salt of ichthyol sulphonic acid as a dentifrice is for the purpose of causing a rapid coagulation of this phlegm-like film, which coagulation is readily removed under the brush. The germicidal action of the ammonium ichthyol sulphonate (ichthyol) or any other salt of ichthyol sulphonic acid used in this invention, furthermore leaves the teeth and the mouth in an excellent state of hygiene, thus retarding any tendency toward pyorrhea or other effects of bacteria such ulceration and sore throat.

I accomplish these results by incorporation of ammonium ichthyol sulphonate (ichthyol) or any other salt of ichthyol sulphonic acid in a soap-calcium carbonate vehicle to which water is added, for proper consistency, and also some essential oils to make the product one of pleasant taste. The formula which I prefer to accomplish these results is as follows:

I first make up several "stock" solutions, viz.

*Stock "A."*

| | Per cent. |
|---|---|
| Soluble saccharine | 25 |
| Water | 75 |
| | 100 |

*Stock "B."*

| | Per cent. |
|---|---|
| Ammonium ichthyol sulphonate | 50 |
| Water | 50 |
| | 100 |

*Stock "C."*

| | Per cent. |
|---|---|
| Thymol | 6 |
| Menthol | 10 |
| Oil eucalyptus | 9 |
| Oil peppermint | 50 |
| Methyl salicylate | 25 |
| | 100 |

I then take, and mix until a smooth and uniform paste results, the following:

| | Per cent. |
|---|---|
| Stock "A" as mixed above | .80 |
| Stock "B" as mixed above | 2.70 |
| Water | 46.00 |
| Powdered soap | 17.00 |
| Stock "C" | 2.00 |
| Calcium carbonate | 31.50 |
| | 100.00 |

This paste is then preferably charged into collapsible tubes for use.

I claim:

1. A dentifrice containing salts of ichthyol sulphonic acid.

2. A dentifrice containing salts of ichthyol sulphonic acid held in a soap-calcium carbonate vehicle.

3. A dentifrice comprising soluble saccharine, ammonium ichthyol sulphonate, thymol, menthol, oil eucalyptus, oil peppermint, methyl salicylate, powdered soap, calcium carbonate and water.

4. A dentifrice comprising soluble saccharine and water, .80%; ammonium ichthyol sulphonate and water, 2.7%; thymol, menthol, oil eucalyptus, oil peppermint and methyl salicylate, 2%; powdered soap, 17%; calcium carbonate, 31.5% and water, 46%.

5. A dentifrice comprising stock "A", consisting of soluble saccharine 25% and water 75%, .8%; stock "B", consisting of ammonium ichthyol sulphonate 50% and water 50%, 2.7%; stock "C", consisting of thymol 6%, menthol 10%, oil eucalyptus 9%, oil peppermint 50% and methyl salicylate 25%, 2%; powdered soap 17%; calcium carbonate 31.5% and water 46%.

In testimony whereof I have hereunto set my hand this 23 day of April, 1924.

EUGENE STAEGEMANN.

Witness:
    THEO. B. BOHR.